United States Patent [19]
Uken et al.

[11] Patent Number: 5,229,058
[45] Date of Patent: * Jul. 20, 1993

[54] ENVIRONMENTAL SEALING

[75] Inventors: David W. Uken, Fremont; Paul G. Schoenstein, Redwood City; Geary Camin, Los Altos, all of Calif.

[73] Assignee: Raychem Corporation, Menlo Park, Calif.

[*] Notice: The portion of the term of this patent subsequent to Dec. 19, 2006 has been disclaimed.

[21] Appl. No.: 663,776

[22] Filed: Mar. 4, 1991

Related U.S. Application Data

[63] Continuation of Ser. No. 275,469, Nov. 23, 1988, abandoned, which is a continuation-in-part of Ser. No. 127,341, Dec. 1, 1987, abandoned.

[51] Int. Cl.⁵ ............................................. B29C 39/00
[52] U.S. Cl. ................................. 264/261; 264/259; 264/272.11; 156/48
[58] Field of Search ............... 264/261, 262, 266, 316, 264/272.11, 259; 156/48, 49, 51

[56] References Cited

U.S. PATENT DOCUMENTS

| | | | |
|---|---|---|---|
| 3,733,382 | 5/1973 | Van Dijk | 264/262 |
| 3,893,961 | 7/1975 | Walton et al. | 524/489 |
| 4,025,600 | 5/1977 | Parr | 264/262 |
| 4,301,325 | 11/1981 | Hutchison | 264/272.11 |
| 4,595,635 | 6/1986 | Dubrow et al. | 427/54.1 |
| 4,607,469 | 8/1986 | Harrison | 264/261 |
| 4,634,207 | 1/1987 | Debbaut | 439/521 |
| 4,680,233 | 7/1987 | Camin et al. | 427/385.5 |
| 4,741,940 | 5/1988 | Reed | 156/48 |
| 4,880,070 | 12/1989 | Clark et al. | 156/48 |
| 4,963,698 | 10/1990 | Chang et al. | 156/49 |

FOREIGN PATENT DOCUMENTS

| | | |
|---|---|---|
| 0100228 | 2/1984 | European Pat. Off. . |
| 0246855A3 | 11/1987 | European Pat. Off. . |
| 2104829 | 3/1983 | United Kingdom ........... 264/272.11 |

Primary Examiner—Allan R. Kuhns
Attorney, Agent, or Firm—Herbert G. Burkard; A. Stephen Zavell

[57] ABSTRACT

Environmental sealing may be achieved by extruding a sealing material having a cone penetration value preferably from 100–350 (10−1 mm) and an ultimate elongation of at least 100% from a material-dispensing gun, having means for example a mesh, for causing the material to be mechanically deformed preferably by shear and preferably causing it to be comminuted.

22 Claims, 2 Drawing Sheets

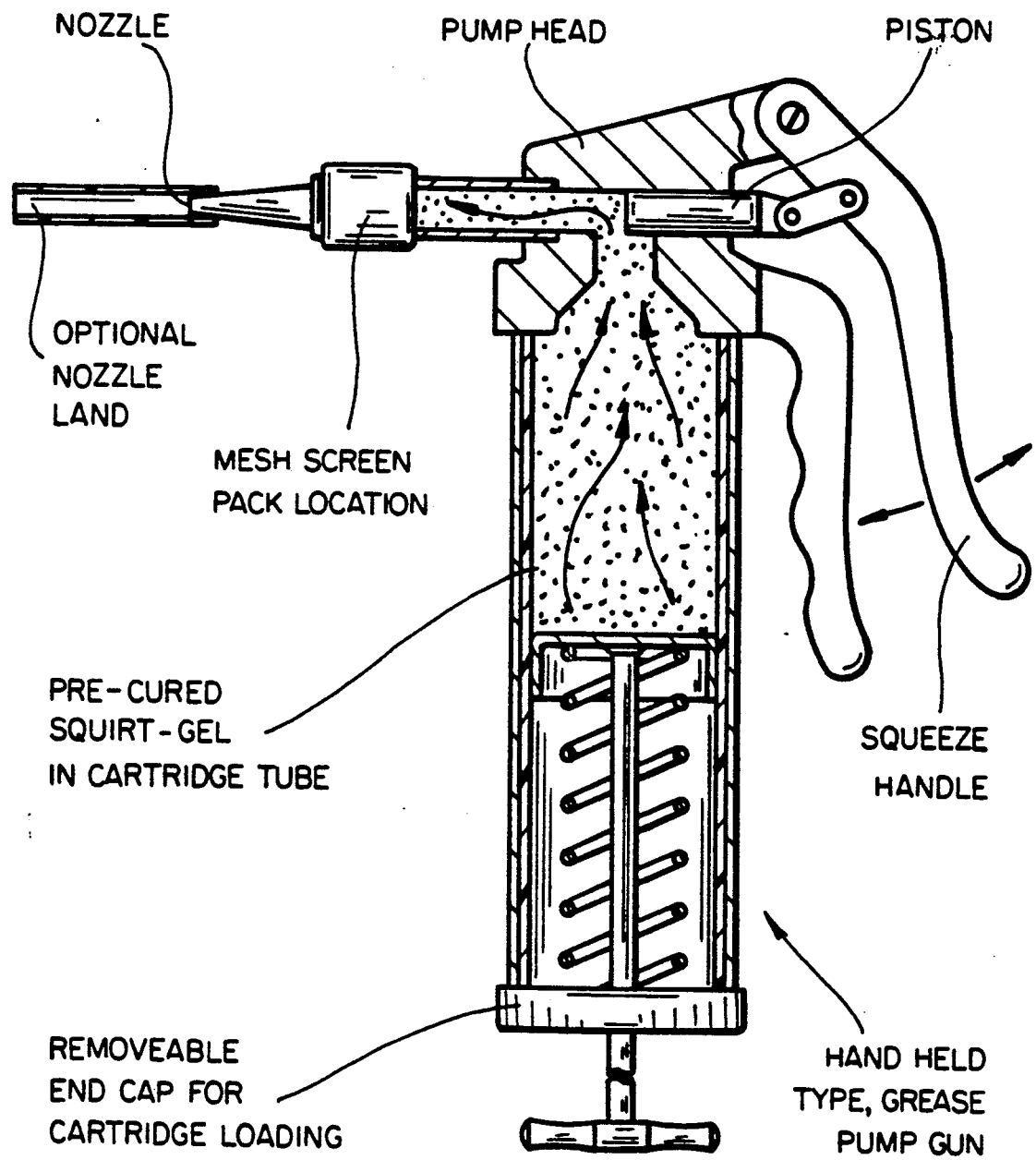
FIG_1

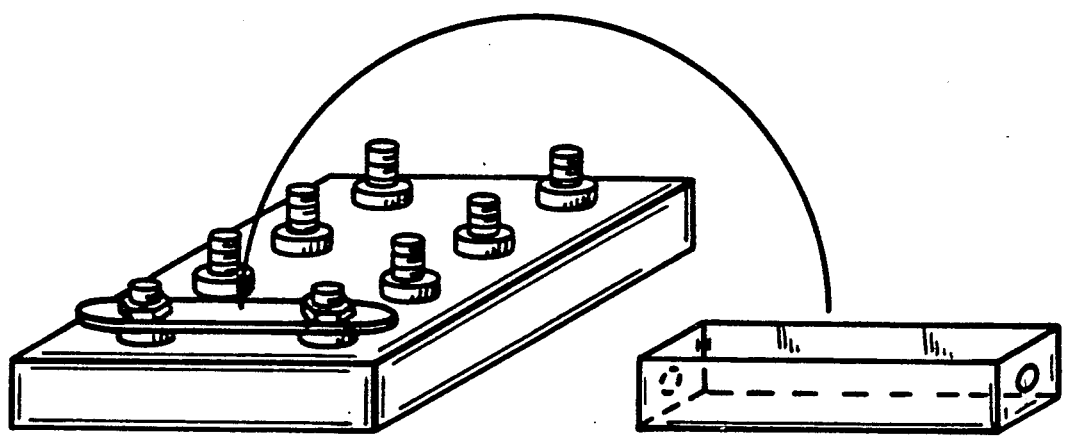
FIG_2
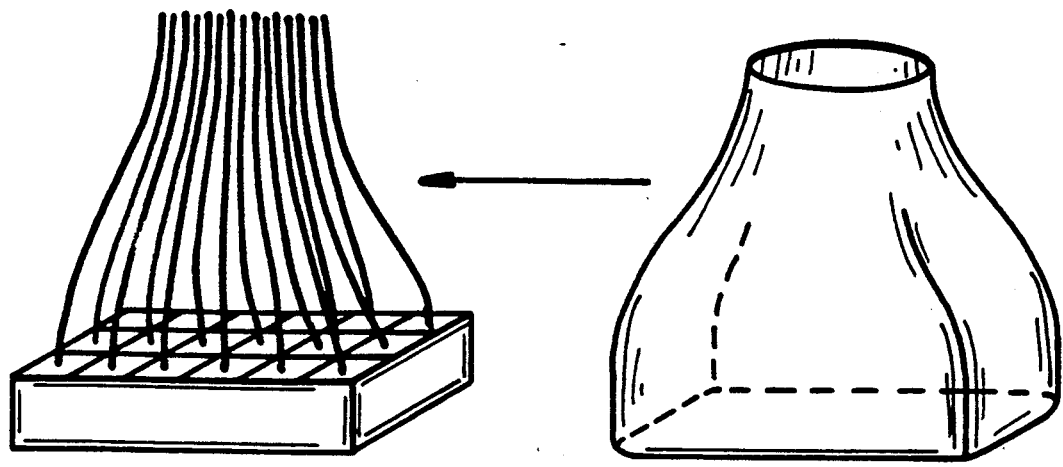
FIG_3

ENVIRONMENTAL SEALING

This application is a continuation of application Ser. No. 07/275,469, filed Nov. 23, 1988, now abandoned, which is a continuation-in-part of application Ser. No. 07/127,341 filed Dec. 1, 1987, now abandoned.

BACKGROUND OF THE INVENTION

The present invention relates to environmental sealing of substrates in the electrical, electronics, telecommunications, power and related industries, particularly to sealing of electrical terminals or other contacts and wire splices.

An environmental seal may be provided in many ways. For example, the substrate to be sealed may be sealed by surrounding it with some sealed box or other enclosure, it may be tape wrapped, it may be painted or it may be coated or surrounded with bulk sealing composition. The present invention is preferably concerned with this last category. Such sealing may be provided to protect the substrate from various contaminants, and in the case of electrical contacts particularly from water.

A problem arises in providing environmental protection due to an inherent conflict between the desire for ease of installation of the sealing means, and tightness of the final seal. This problem is often overcome by having the sealing means undergo some change in physical condition, for example a paint may be applied as a liquid that subsequently solidifies. An alternative is the provision of a thermoplastic material, such as a hot-melt adhesive, that may be softened or melted and then applied to the substrate and allowed to solidify. Another example is a curable composition that in its pre-cured state has a low viscosity allowing it to be poured in place around the substrate, after which it is caused to cure.

For many applications, dimensionally heat-recoverable articles are used to provide rugged, long-lasting environmental seals. Such an article may be supplied in an expanded, enlarged, form in which it is positioned loosely around the substrate and then heated to cause it to shrink into tight engagement with the substrate.

Recently it has been proposed to provide an environmental seal by means of a sealing material that is supplied pre-cured in some form of container which is then fixed relative to the substrate so that the sealing material is held under pressure against a surface of the substrate to be sealed. This technique may be contrasted with one where a sealing material in an uncured form is poured into a container to surround the substrate and is then cured in situ. Pre-curing has many advantages, particularly ease and speed of installation in the field.

An apparatus for providing environmental sealing in this way is disclosed and claimed in U.S. Pat. No. 4,600,261 (Debbaut), the disclosure of which is incorporated herein by reference. That patent discloses a protection apparatus comprising:

(a) an insulating gel characterized by
  (1) a cone penetration value from approximately 150-350 (10−1 mm);
  (2) an ultimate elongation of at least approximately 200%;
  (3) a maximum tensile strength of approximately 20 psi;
  (4) a cohesive strength greater than its adhesive strength;
(b) first means to contain said gel;
(c) second means to retain said gel within said first means; and
(d) force means which acts on said first means so that said gel is maintained in compressive contact with said electrical contact and substantially encapsulates a conductive portion of said electrical contact, whereby upon release of said force means and a disengagement of said first means from said electrical contact, said gel remains substantially within said first means.

U.S. Pat. No. 4,634,207, the disclosure of which is incorporated herein by reference, discloses an apparatus for protecting a substrate, comprising (a) a gel, the gel being cured prior to coming into contact with any part of the substrate to be protected, the gel having a cone penetration value of 100-350 (10−1 mm) and an ultimate elongation of at least 200%; and
(b) means for deforming the gel into close and conforming contact with the substrate.

Also disclosed is a process for protecting a substrate, comprising the steps of:
  pressing together a substrate to be protected and an apparatus comprising a support member, a gel located on the support member, the gel being cured prior to coming into contact with any part of the substrate, the gel having a cone penetration value of 100 to 350 (10−1 mm) and an ultimate elongation of at least 200%, and means for deforming the gel into close and conforming contact with the substrate, the apparatus and the substrate being pressed together so that the gel contacts the substrate and is deformed into close and conforming contact therewith.

The use of sealing materials for environmental protection is also disclosed in the following patents, the disclosures of each of which are incorporated herein by reference: U.S. Pat. No. 4,643,924 (Uken et al.), U.S. Pat. No. 4,690,831 (Uken et al.), U.S. Pat. No. 4,581,265 (Follette), U.S. Pat. No. 4,610,910 (Follette), U.S. Pat. No. 4,610,738 (Jervis), U.S. Pat. No. 4,600,804 (Howard), U.S. Pat. No. 4,701,574 (Shimirak), USSN 901,971 filed 29 Aug. 1986 (Dubrow) equivalent to EP-A-0194872, USSN 859,171 filed 29 May 1986 (Kayser) equivalent to EP-A-0225370, U.S. Pat. No. 4,662,692 (Uken et al.), U.S. Pat. No. 4,647,717 (Uken), USSN 767,555 (Story) filed 20 Aug. 1985 equivalent to EP-A-0213874, USSN 801,018 (Gamarra) filed 22 Nov. 1985 equivalent to EP-A-0224389, and USSN 945,219 (Chang) filed 22 Dec. 1986 equivalent to EP-A-0174165.

Cone penetration values in the above-mentioned specifications are unless the context otherwise requires or states, and are in this specification, expressed in units of 10−1 mm and are measured by ASTM D217-68 at 70° F. (21 C.) on an undisturbed sample using a standard 1:1 scale cone (cone weight 102.5 g, shaft weight 47.5 g), the penetration being measured after 5 seconds.

Ultimate elongation values in the above-mentioned specifications are unless the context otherwise requires or states, and are in this specification, as measured according to the technique of ASTMD 638-80 at 70° F. (21 C.) using a type 4 die to cut the sample and at a speed of 50 cm/minute.

A problem can arise in difficult circumstances with the above prior art sealing material (referred to in general terms herein as a "gel") and/or above prior art methods. That problem may arise where the substrate is of a complex shape since it may then be difficult to cause the gel fully to cover all surfaces of the substrate by forcing against the substrate a gel pre-cured or cast in a container. This is likely to be the case where the substrate is deep and must therefore penetrate a great distance into the gel, or where the substrate comprises many wires around which the gel must be caused to flow.

An alternative of pouring a liquid material around the substrate and then curing is likely to be unacceptable because it is impractical, time consuming and may result in the release of undesirable gasses during curing. The use of a hot-melt sealing material is frequently impractical due to the amount of heat required, and consequent possible damage to the substrate.

We have now found that this problem of installation of materials of the general type referred to as gels can be overcome by subjecting the material to mechanical deformation prior to use. This then allows the material to be directed to the position where it is required, by for example extrusion through a nozzle. The step of extrusion itself may provide the desired mechanical deformation. We have found that the flow properties of the material may be suitably altered by this deformation, but that it is able, where necessary, afterwards to cohere or to "knit" back together again, retaining a sufficient ultimate elongation or other property required during its service life.

SUMMARY OF THE INVENTION

Thus, the invention provides a method of environmentally protecting a substrate, which comprises:
(a) providing (preferably at ambient temperature) a sealing material having an ultimate elongation according to ASTMD 638-80 of at least 100% and a cone penetration according to ASTM D217-68 at 21 C. of greater than 100 (10−1 mm);
(b) subjecting (preferably at ambient temperature) the material to a shear force greater than its cohesive strength; and
(c) then causing (preferably at ambient temperature) the material to flow over the surface of the substrate.

The material and the shear process are preferably such that substantially no shear heat is generated.

The sealing material is preferably at least partially cross-linked, for example at least 0.01 to 6 cross-links per weight average molecule, more preferably 0.5 to 4, especially 0.5 to 2 cross-links.

A container may be provided around the substrate, into which the material is directed, preferably by extrusion from a material-dispensing gun, for example of the general type known as a grease-gun. Alternatively, the material may be extruded or otherwise directed into the container, and the container with the material then positioned around the substrate. We have found surprisingly that when the container is thus positioned with respect to the substrate, the sealing material flows (for example by folding or rolling) around the substrate causing it to be covered in a most satisfactory way. This may be compared to the covering that is achieved with similar gel materials that have not undergone shear. In that case the material appears to have a skin that first stretches and finally breaks, but even then the material may not properly squeeze back over the substrate without excessive trapping of air.

The effect of shear in allowing such materials to be directed by extrusion or otherwise, but to retain their elongation or elastic memory or other properties, was quite unexpected. Also unexpected was the effect of shear in improving the ability of such materials prepositioned in a container to be deformed around a substrate. Shear preferably causes the material to be fragmented, which may be regarded as causing comminution, fracture, or brecciation, or chopping, depending on the size and size distribution of resulting particles. Small particles are preferred.

The mechanical deformation of the material is preferably carried out by forcing it through a mesh. The effect that this has on the material may be regarded as comminution. Its flow properties are thereby improved. In the case of gels as referred to above, the resulting material may be regarded as an agglomeration of particles, each comprising a cross-linked network containing an un-cross-linked or liquid component, the particles being loosely interconnected by adhering together, possibly by autoadhesion. Before the mechanical deformation the material may be regarded as a single cross-linked network containing the uncross-linked or liquid component. This change may be reflected in an increase in it $G''$ value, $G''$ being its loss modulus as determined by dynamic spectroscopy. The material may then be directed as desired by extrusion etc.

The invention therefore also provides a method of producing a sealing material which comprises:
(a) providing a material having an ultimate elongation according to ASTM D638-80 of at least 100%;
(b) fragmenting the material; and
(c) compressing the material thereby causing constituent particle thereof to adhere together.

Compression preferably occurs during extrusion, and this can be enhanced by correct choice of extrusion nozzle size and land length.

We have found also that advantageous sealing materials, particularly for the installation techniques disclosed herein, have a lower stress relaxation than that of otherwise similar prior art gel.

Thus, the invention also provides a sealing material which has:
(a) an ultimate elongation according to ASTM D638-80 of at least 100%;
(b) a cone penetration value of at least 150 (10−1 mm); and
(c) a stress relaxation time, being the time at which the stress relaxation ratio is e-1, of less than 900 seconds.

Stress relaxation is to be performed at 23° C. for 1 hour using a dynamic spectrometer (such as Rheometrics RDS-770, trade mark) in the transient parallel plate mode. A stress relaxation ratio may be defined as the ratio of the stress, or modulus, G(T), at time t divided by peak stress achieved when the strain is applied at time t=0. The stress relaxation time is therefore the time at which the stress relaxation ratio is equal to e-1, i.e. 0.368; e-1 describing the exponential decay of an idealized stress relaxation curve.

We prefer that the sealing material has a stress relaxation time of less than 800 seconds, more preferably less than 700 seconds, particularly less than 500 seconds.

Sealing material may be supplied in any convenient way. For some uses the material may be extruded from a material-dispensing gun, and the invention therefore further provides a cartridge (optionally a disposable cartridge) having therein a cured material having an ultimate elongation of at least 100% according to ASTM D638-80 and a cone penetration value of 150–350 (10−1 mm).

The sealing material may be supplied in a device that provides one or more of the following:

a) means for containing the material prior to use;
(b) means for physically deforming the material by shear or otherwise;
(c) means for directing the material by extrusion or otherwise to its desired position;
(d) means for locating the material around a substrate to be protected; and
(e) means for maintaining the sealing material under pressure against a surface of the substrate.

The sealing material of the invention or used in a method or article of the invention preferably has one or more of the following properties.

Cone penetration

The cone penetration of the material before use is preferably greater than 100, more preferably greater than 150, particularly greater than 170, especially greater than 200 (10−1 mm) It is preferably less than 400, more preferably less than 350, especially less than 300 (10−1 mm).

Ultimate elongation

The ultimate elongation of the material before use is preferably greater than 50%, more preferably greater than 100, particularly greater than 200%, more particularly greater than 300%.

Storage modulus (G')

Storage modulus of the material before use is determined by dynamic spectroscopy (using for example a Rheometrics RDS-7700, trade mark) measured at 24° C. on a 25mm diameter disc at 1 Hz frequency. G' is preferably less than 107 dynes/cm2, more preferably less than 5×106 dynes/cm2, particularly less than 106 dynes/cm2, especially less than 5×105 dynes/cm2.

Tan delta

Tan delta of the material before use is the ratio between the loss modulus (G'') and the storage modulus (G'), each in dynes/cm2, each determined by dynamic spectroscopy. Tan delta is preferably less than 1, i.e. the storage modulus is preferably greater than the loss modulus. More preferably tan delta is less than 0.8, particularly less than 0.7.

Stress relaxation time

For the material after deformation, this is preferably less than 900 seconds, more preferably less than 700 seconds, particularly less than 500 seconds, especially less than 200 seconds. Preferably it is greater than 10 seconds, particularly greater than 50 seconds. It is desirable that the material relax as fast as possible initially (so that the material can easily surround a substrate) and then not relax further, so that it can be put and remain under compression.

Tack

The sealing material before and after deformation is preferably tacky, more preferably has high tack.

The means for mechanically deforming and for dispensing the sealing material preferably have one or more of the following characteristics.

The material and the means for dispensing are preferably such that the material can be dispensed under a pressure of less than 3000 psi, more preferably less than 2000 psi, particularly less than 1500 psi, particularly less than 1000 psi, more particularly less than 500 psi.

The flow rate of the material from the means for dispensing is preferably greater than 0.01 grams per second, more preferably greater than 0.1 grams per second, particularly greater than 1.0 grams per second, especially greater than 10 grams per second.

The means for deforming the material is preferably a mesh, grid or other perforate structure. Preferably the structure is, or is equivalent to, the size of 50 mesh (holes per inch) or finer, more preferably 70 mesh or finer, particularly 100 mesh or finer, more particularly 150 mesh or finer.

The material is preferably extruded through a nozzle of diameter greater than 0.075 cms, preferably greater than 0.1 cm, preferably greater than 0.2 cm. A smaller nozzle helps to stick the particles of comminuted material back together.

The nozzle land preferably has a length of at least 1 cm, more preferably at least 2 cm, particularly at least 3 cm. The land through which the material passes after deformation helps to cause pressure or flow orientation or gives the material time to relax some of its original memory before pressure reduction.

BRIEF DESCRIPTION OF THE DRAWINGS

FIG. 1 shows a material-dispensing gun; and
FIGS. 2 and 3 show electrical connectors to be sealed with a sealing material.

DETAILED DESCRIPTION OF THE DRAWINGS

FIG. 1 shows a material dispensing gun containing a sealing material. The gun has a mesh through which the sealing material can be forced to deform it mechanically, for example by shear. The gun also has a nozzle.

FIG. 2 shows a terminal block having brass connection posts and a connecting bar that require corrosion protection. It can be difficult with prior art gels to obtain good protection under the connecting bar and under undercuts on the terminal posts. We have found that, using the invention, sealing material can be directly extruded under the bar, or can be first placed in a container (illustrated to the right of the connecting block) and the container then placed over the terminals and bar.

FIG. 3 shows a connector that may be part of an automobile wiring system. An array of wires (say six by three) exit from a waffle-shaped connector back. A cover (illustrated to the right of the connector back) can be prefilled with sealing material, or can be positioned over the connector back and then filled with sealing material. An air release hole may be provided to aid filing. Thus, a cover can be provided having two holes; one for injection of sealing material and the other for release of air.

The sealing material is usually electrically insulating (i.e. has a resistivity of at least 109 ohm.cm), but is not necessarily so for some possible uses of the invention, e.g. when non-electrical substrates are being protected. Suitable sealing materials include materials made by gelling curable polyurethane precursor materials (as described for example in the patents referenced above in the presence of substantial quantities of a mineral oil, a vegetable oil or a plasticizer, or a mixture of two or more of these. Thus we have obtained excellent results using sealing materials prepared by gelling components which are commercially available for the preparation of polyurethane gels in situ, the gelation being carried out, however, in the presence of a suitable amount, e.g. 30 to 70% by weight, of a suitable plasticizer, e.g. a trimellitate, or in the presence of a suitable animal or vegetble oil, e.g. 80 to 60%, preferably 80 to 70%, by weight of a mixture of mineral and vegetable oils in which the ratio by weight of mineral oil to vegetable oil is 0.7 to 2.4. Suitable sealing materials can also be prepared by curing reactive silicones with nonreactive extender silicones, and the invention includes the use of any sealing material having the desired cone penetration and elongation values. The sealing material may contain known additives such as moisture scavengers (e.g. benzoyl chloride), antioxidants, pigments and fungicides. The sealing material is preferably hydrolytically stable, moisture-insensitive, and substantially inert towards the substrate.

We claim:

1. A method of environmentally protecting a substrate which comprises:
   (a) subjecting a sealing material that is at least partially cross-linked and having an ultimate elongation according to ASTM D638-80 of at least 100% and a cone penetration at cure according to ASTM D217-68 at 21° C. of greater than 100 (10—1 mm) to a shear force greater than its ultimate cohesive strength to cause a fragmentation of the sealing material prior to but in the process of contacting a substrate to be protected;
   (b) causing the sheared material to flow over and contact a surface of the substrate to be protected; and
   (c) maintaining the sheared material in contact against the surface of the substrate to be protected.

2. A method according to claim 1, in which the material has a cone penetration value of at least 150 (10−1 mm).

3. A method according to claim 1, in which the material after subjection to shear, has a stress relaxation time, being the time at which the stress relaxation ratio is equal to e-1, of less than 900 seconds 4. A method according to claim 1, in which the material provided has a tan delta value, being the ratio of loss modulus to storage modulus as determined by dynamic spectroscopy, of less than 1.

5. A method according to claim 1, in which the material is subjected to shear by passing it through a perforate structure.

6. A method according to claim 1, in which the material is forced through a nozzle and land such that the material is oriented under pressure.

7. A method according to claim 1, in which the material is mechanically deformed in such a way as to increase its G" value, G" being its loss modulus as determined by dynamic spectroscopy.

8. A method according to claim 1, in which the material provided is cross-linked.

9. A method according to claim 1, in which the substrate comprises an electrical terminal or wire splice.

10. A method according to claim 1, in which the material is a cross-linked material before step (b).

11. The method according to claim 1 wherein the material before use has a cone penetration of at least 170(10−1 mm) but less than 400 (10−1 mm).

12. The method according to claim 5 wherein the material before use has a cone penetration of at least 170(10−1 mm) but less than 400 (10−1mm).

13. The method according to claim 8 wherein the material before use has a cone penetration of at least 170(10−1 mm) but less than 400 (10−1 mm).

14. A method of environmentally sealing a substrate which comprises:
   (a) providing a container around the substrate;
   (b) subjecting a sealing material having an ultimate elongation according to ASTM D638-80 of at least 100% and a cone penetration at cure according to ASTM D217-68 at 21° C. of greater than 100 (10—1 mm) to shear forces sufficient to cause a fragmentation of the sealing material; and
   (c) extruding the sheared material into the container such that it surrounds the substrate.

15. A method according to claim 14, in which:
   (a) the material is subjected to shear;
   (b) the container is provided around the substrate; and
   (c) then the material is extruded into the container.

16. A method according to claim 14, in which:
   (a) the material is subjected to shear;
   (b) then the material is extruded into the container; and
   (c) then the container with the material therein is positioned around the substrate.

17. A method according to claim 14, which additionally comprises maintaining the material under pressure against the surface of the substrate to be sealed.

18. The method according to claim 14 wherein the material before use has a cone penetration of at least 170(10−1 mm) but less than 400 (10−1 mm).

19. The method according to claim 15 wherein the material before use has a cone penetration of at least 170(10−1 mm) but less than 400 (10−1 mm).

20. The method according to claim 16 wherein the material before use has a cone penetration of at least 170(10−1 mm) but less than 400 (10−1 mm).

21. A method according to claim 15, which additionally comprises maintaining the material under pressure against the surface of the substrate to be sealed.

22. A method according to claim 16, which additionally comprises maintaining the material under pressure against the surface of the substrate to be sealed.

* * * * *

UNITED STATES PATENT AND TRADEMARK OFFICE
CERTIFICATE OF CORRECTION

PATENT NO. : 5,229,058
DATED : July 20, 1993
INVENTOR(S) : David W. Uken, Paul G. Schoenstein, Geary Camin Page 1 of 3

It is certified that error appears in the above-indentified patent and that said Letters Patent is hereby corrected as shown below:

Column 1, line 61, replace "(10-1mm)" by --$(10^{-1}mm)$--.

Column 2, line 16, replace "(10-1mm)" by --$(10^{-1}mm)$--.

Column 2, line 27, replace "(10-1mm)" by --$(10^{-1}mm)$--.

Column 2, line 54, replace " 10-1mm " by --$(10^{-1}mm)$--.

Column 2, line 61, replace "ASTMD 638-80" by --ATM D638-80--.

Column 3, line 34, replace "ASTMD 638-80" by --ASTM D638-80--.

Column 3, line 36, replace "(10-1mm)" by --$(10^{-1}mm)$--.

Column 4, line 21, replace "it" by --its--.

Column 4, line 31, replace "particle" by --particles--.

UNITED STATES PATENT AND TRADEMARK OFFICE
CERTIFICATE OF CORRECTION

PATENT NO. : 5,229,058
DATED : July 20, 1993
INVENTOR(S) : David W. Uken, Paul G. Schoenstein, Geary Camin It is certified that error appears in the above-indentified patent and that said Letters Patent is hereby corrected as shown below:

Column 4, lines 43 to 44, replace "(10-1mm)" by --$(10^{-1}mm)$--.

Column 4, line 68, replace "(10-1mm)" by --$(10^{-1}mm)$--.

Column 5, line 3, replace "a)" by --(a)--.

Column 5, line 20, replace "(10-1mm)" by --$(10^{-1}mm)$--.

Column 5, line 22, replace "(10-1mm)" by --$(10^{-1}mm)$--.

Column 5, line 27, replace "100" by --100%--.

Column 5, line 33, replace "RDS-7700" by --RDS-770--.

Column 5, line 35, replace "cm2" by --$cm^2$--.

Column 5, line 36, replace "cm2" by --$cm^2$--.

Column 5, line 37, replace in two places, replace "cm2" by --$cm^2$--.

UNITED STATES PATENT AND TRADEMARK OFFICE
CERTIFICATE OF CORRECTION

PATENT NO. : 5,229,058
DATED : July 20, 1993
INVENTOR(S) : David W. Uken, Paul G. Schoenstein, Geary Camin It is certified that error appears in the above-indentified patent and that said Letters Patent is hereby corrected as shown below:

Column 5, line 42, replace "cm2" by --$cm^2$--.

Column 6, line 63, replace "above" by --above).

Col. 7,
Claim 1, line 7, replace "(10mm-1)" by --$(10^{-1}mm)$--.

Claim 2, line 2, replace "(10mm-1)" by --$(10^{-1}mm)$--.
Col. 8,
Claim 14, lines 7 to 8 replace "(10mm-1)" by --$(10^{-1}mm)$--.

Signed and Sealed this

Eighth Day of August, 1995

Attest:

BRUCE LEHMAN

Attesting Officer        Commissioner of Patents and Trademarks